(12) United States Patent
Oz et al.

(10) Patent No.: US 7,571,205 B2
(45) Date of Patent: Aug. 4, 2009

(54) METHOD AND SYSTEM FOR OPTIMIZING A SOFTWARE-DEFINED RADIO SYSTEM

(75) Inventors: Jasmin Oz, Plano, TX (US); Eran Pisek, Plano, TX (US); Yan Wang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 945 days.

(21) Appl. No.: 11/173,131

(22) Filed: Jul. 1, 2005

(65) Prior Publication Data

US 2006/0230187 A1    Oct. 12, 2006

Related U.S. Application Data

(60) Provisional application No. 60/668,795, filed on Apr. 6, 2005.

(51) Int. Cl.
    *G06F 13/00* (2006.01)

(52) U.S. Cl. .................. 709/201; 719/319; 717/104

(58) Field of Classification Search .............. 709/201; 719/719; 717/104
    See application file for complete search history.

(56) References Cited

U.S. PATENT DOCUMENTS

| 6,202,070 | B1 * | 3/2001 | Nguyen et al. | 707/104.1 |
| 2002/0083432 | A1 * | 6/2002 | Souissi et al. | 717/178 |
| 2004/0098715 | A1 * | 5/2004 | Aghera et al. | 717/173 |

\* cited by examiner

*Primary Examiner*—Viet Vu

(57) ABSTRACT

A method for optimizing a software-defined radio system comprising a plurality of processors is provided. The method includes, for each of the plurality of processors, (i) providing an input burst comprising a first specified burst size, M, of input words to the processor for each of a plurality of configurations, each input word comprising an integer, and (ii) receiving from the processor an output burst comprising a second specified burst size, N, of output words generated by the processor based on the M input words for each of the configurations. An optimization factor is determined for each of the configurations based on the N output words generated by each processor for the configuration. An optimized configuration is identified from the plurality of configurations based on the optimization factor of each of the configurations.

20 Claims, 2 Drawing Sheets

METHOD AND SYSTEM FOR OPTIMIZING A SOFTWARE-DEFINED RADIO SYSTEM

CROSS-REFERENCE TO RELATED APPLICATION AND CLAIM OF PRIORITY

The present invention is related to that disclosed in U.S. Provisional Patent No. 60/668,795, filed Apr. 6, 2005, entitled "Architecture Exploration Tool for Software-Defined Radio Systems." U.S. Provisional Patent No. 60/668,795 is assigned to the assignee of the present application. The subject matter disclosed in U.S. Provisional Patent No. 60/668,795 is hereby incorporated by reference into the present disclosure as if fully set forth herein. The present application hereby claims priority under 35 U.S.C. §119(e) to U.S. Provisional Patent No. 60/668,795.

TECHNICAL FIELD OF THE INVENTION

The present invention relates generally to wireless networks and, more specifically, to a mechanism for optimizing a software-defined radio system.

BACKGROUND OF THE INVENTION

Software-Defined Radio (SDR) systems include hardware and software technologies that enable reconfigurable system architectures for wireless networks and user devices, such as mobile stations. SDR provides a way to update multi-mode, multi-band, multi-functional wireless devices with software upgrades. Thus, mobile stations and wireless network infrastructure may be dynamically programmed in software to reconfigure their characteristics. In this way, a single hardware block may be modified to perform different functions at different times, allowing manufacturers to concentrate development efforts on a common hardware platform.

However, currently implemented SDR systems have optimization problems with maximizing throughput while balancing bus loads. Because the complexity of optimization increases exponentially as a function of system parameters, current systems generally implement one of many possible system constellations without attempting to identify the optimal system constellation, resulting in a suboptimal SDR system.

Therefore, there is a need in the art for an improved SDR system that may be optimized. In particular, there is a need for an SDR system that may have the optimal system parameters implemented for any particular cycle based on high-level modeling of the system architecture and a subsequent search for the optimal system constellation.

SUMMARY OF THE INVENTION

In accordance with the present invention, a method and system for optimizing a software-defined radio system are provided that substantially eliminate or reduce disadvantages and problems associated with conventional methods and systems.

To address the above-discussed deficiencies of the prior art, it is a primary object of the present invention to provide a method for optimizing a software-defined radio system comprising a plurality of processors. According to an advantageous embodiment of the present invention, the method includes, for each of the plurality of processors, (i) providing an input burst comprising a first specified burst size, M, of input words to the processor for each of a plurality of configurations, and (ii) receiving from the processor an output burst comprising a second specified burst size, N, of output words generated by the processor based on the M input words for each of the configurations. An optimization factor is determined for each of the configurations based on the N output words generated by each processor for the configuration. An optimized configuration is identified from the plurality of configurations based on the optimization factor of each of the configurations.

According to one embodiment of the present invention, the first specified burst size, M, and the second specified burst size, N, comprise independent integer values.

According to another embodiment of the present invention, a first one of the N output words is generated by the processor performing a checksum on the M input words and each subsequent one of the N output words is generated by the processor incrementing an immediately previous one of the N output words by one.

According to still another embodiment of the present invention, the processor performing the checksum comprises the processor performing an XOR operation.

According to yet another embodiment of the present invention, providing the M input words to the processor comprises providing the M input words to the processor at an input rate that is a parameter of the configuration.

According to a further embodiment of the present invention, the method also includes providing an output rate that is a parameter of the configuration, and the processor is operable to generate the N output words at the output rate, which is the processor throughput.

According to a still further embodiment of the present invention, the first specified burst size, M, for one of the processors is independent of the first specified burst size, M, for another one of the processors.

According to yet a further embodiment of the present invention, the second specified burst size, N, for one of the processors is independent of the second specified burst size, N, for another one of the processors.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
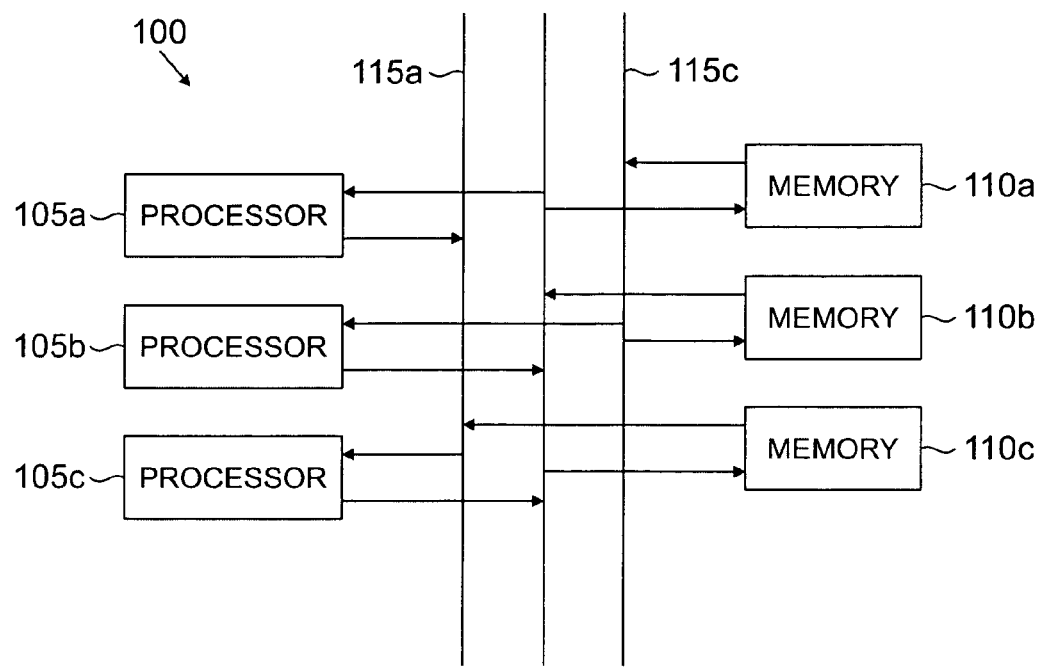
FIG. 1 illustrates an exemplary software-defined radio system that may be optimized according to the principles of the present invention.
Figure 2:
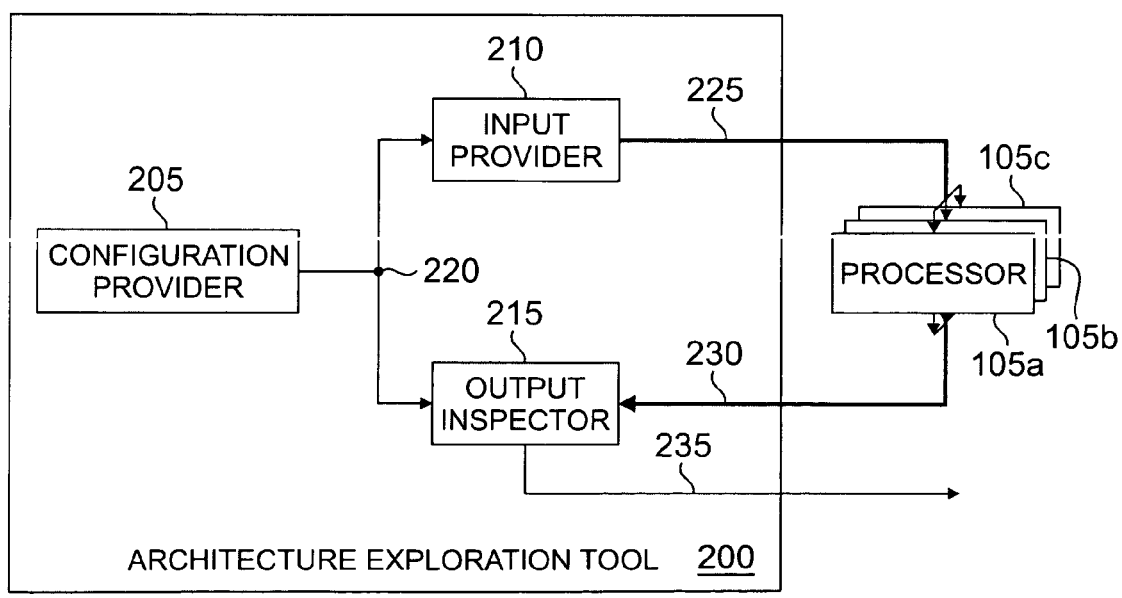
FIG. 2 illustrates an architecture exploration tool capable of optimizing the software-defined radio system of FIG. 1 according to the principles of the present invention.
Figure 3:
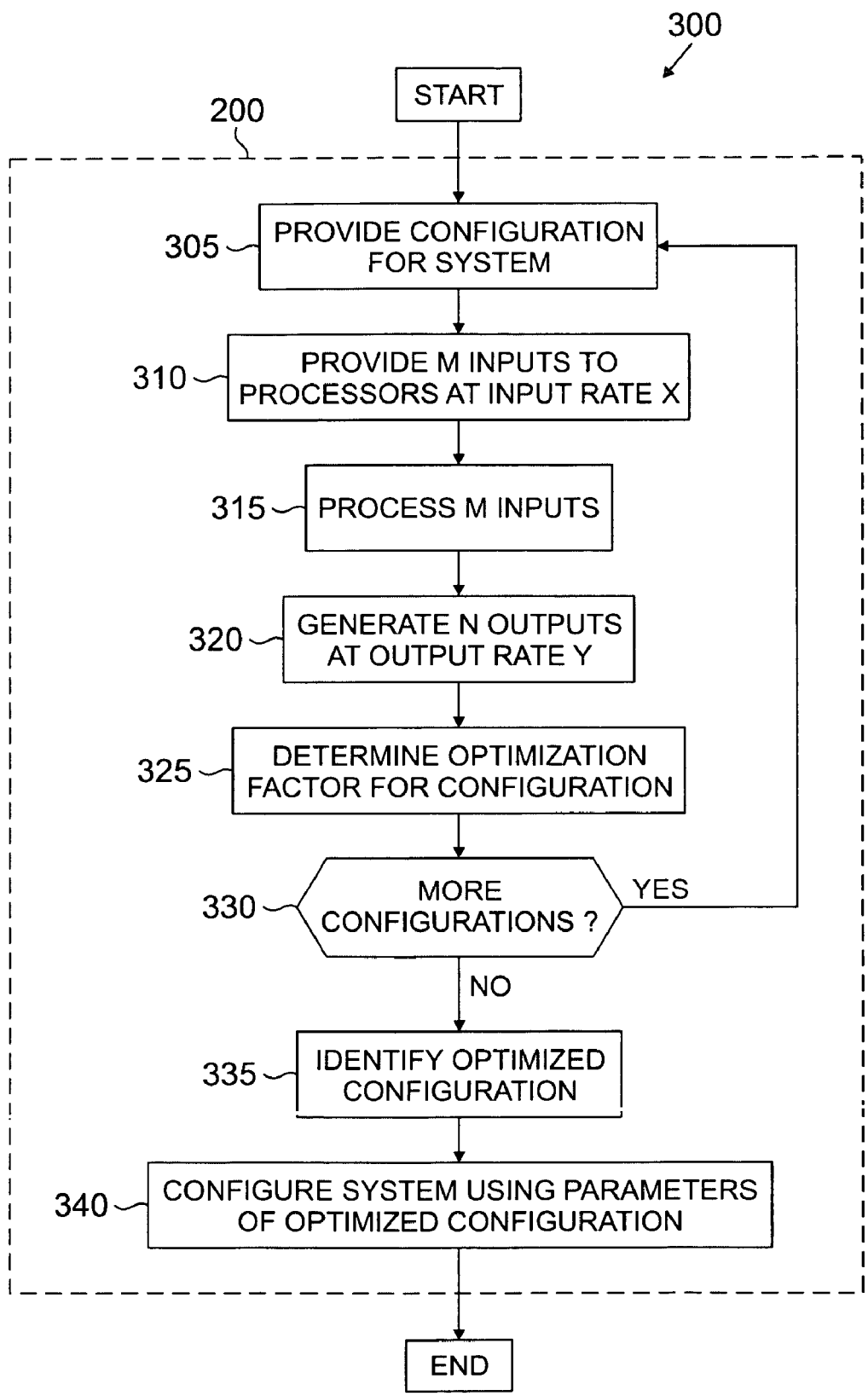
FIG. 3 is a flow diagram illustrating a method for optimizing the software-defined radio system of FIG. 1 using the architecture exploration tool of FIG. 2 according to the principles of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged software-defined radio system.

FIG. 1 illustrates an exemplary software-defined radio system 100 that may be optimized according to the principles of the present invention. System 100 comprises a plurality of processors 105a-c and memories 110a-c coupled to each other and operable to communicate over a plurality of buses 115a-c. Each processor 105 is characterized by parameters such as throughput, data bit width, burst size, and the like. Although the illustrated embodiment includes three processors 105, three memories 110, and three buses 115, it will be understood that system 100 may comprise any suitable number of each these components without departing from the scope of the present invention.

As described in more detail below in connection with FIGS. 2 and 3, system 100 is operable to be optimized through the use of an architecture exploration tool. The architecture exploration tool is operable to provide inputs to each of processors 105 for each of a plurality of configurations. Each processor 105 is operable to process the inputs received from the architecture exploration tool to generate results. The architecture exploration tool is then operable to evaluate the results in order to determine the maximum possible throughput while balancing bus loads for system 100 by identifying an optimal configuration. Thus, based on high-level modeling of the system architecture and a subsequent search for the optimal system constellation provided by the architecture exploration tool, system 100 may be implemented with optimized system parameters for any particular cycle.

FIG. 2 illustrates an architecture exploration tool 200 capable of optimizing software-defined radio system 100 according to the principles of the present invention. According to the illustrated embodiment, architecture exploration tool 200 comprises a configuration provider 205, an input provider 210, and an output inspector 215.

Configuration provider 205 is operable to be programmed by a user with any suitable number of possible configurations for system 100. As used herein, a "configuration" refers to a set of parameters for each processor 105 in system 100. These parameters may include, for example, an input burst size, an output burst size, an input rate, an output rate, an input data bit width, an output data bit width and/or the like. Configuration provider 205 is operable to provide each configuration 220, one at a time, to input provider 210 and output inspector 215 for testing.

Input provider 210 is coupled to configuration provider 205 and is operable to receive a plurality of configurations 220, one at a time, to be tested for optimization of system 100. Input provider 210 is also coupled to processors 105 and is operable to provide an input set 225 to each processor 105 based on configuration 220 received from configuration provider 205. It will be understood that the input set 225 provided to each processor 105 may or may not be the same as input sets 225 provided to the other processors 105.

For one embodiment, each input set 225 comprises, for each processor 105, a specified burst size, M, input words to be provided to that particular processor 105 at an input rate of X input words/clock cycle and a specified burst size, N, of output words to be generated by that processor 105 at an output rate of Y output words/clock cycle. For this embodiment, M comprises any suitable positive integer and X comprises any suitable input rate for processor 105 based on the type of system 100 in which processors 105 are implemented. For a particular embodiment, the M input words comprise integer numbers ranging from 0 up to M−1. However, it will be understood that the M input words may comprise any suitable integers without departing from the scope of the present invention. Similarly, N comprises any suitable positive integer, independent of M, and Y may be based on the throughput requirement of processor 105 for the implemented system 100. Thus, it will be understood that the value of M may be less than, equal to, or greater than the value of N.

Each processor 105 is coupled to input provider 210 and is operable to receive an input set 225. Each processor 105 is operable to process the M input words in input set 225 at the input rate X to generate N output words 230. For one embodiment, each processor 105 is operable to process the M input words by performing a checksum or other suitable operation on the M input words and incrementing the result.

Each processor 105 is also operable to send the checksum and/or other suitable outputs 230 to output inspector 215. For a particular embodiment, each processor 105 is operable, at the output rate Y, to perform an XOR operation on the M input words to generate a first output 230, to increment the first output by one to generate a second output 230, to increment the second output by one to generate a third output 230, and so on until an $N^{th}$ output 230 is generated for that configuration 220. However, it will be understood that any suitable processing of the M input words to generate N output words 230 at the output rate Y may be performed without departing from the scope of the present invention.

Output inspector 215 is coupled to configuration provider 205 and processors 105. Output inspector 215 is operable to receive configuration 220 from configuration provider 205 and the outputs 230 from processors 105. Output inspector 215 is also operable to determine an optimization factor associated with the particular configuration 220 based on the outputs 230 associated with that configuration 220.

Output inspector 215 is also operable to verify that processors 105 are working properly because output inspector 215 is operable to determine what output words 230 should be received from each processor 105 for each configuration 220. Thus, if output words 230 fail to match what output inspector 215 is expecting from a particular processor 105, output inspector 215 is operable to identify that processor 105 as one that is not functioning properly for configuration 220.

Configuration provider 205 is also operable to provide, in succession, any or all remaining configurations 220 to input provider 210 and output inspector 215. Thus, eventually, a plurality of possible configurations 220 will be processed by processors 105, and output inspector 215 will be able to determine an optimization factor for each processed configuration 220 based on its associated outputs 230 generated by processors 105.

Once each possible configuration 220 has been processed, configuration provider 205 may be operable to notify output inspector 215 that no more configurations 220 will be provided. Alternatively, output inspector 215 may determine that all configurations 220 have been processed based on a specified amount of time elapsing without a new configuration 220 and its associated outputs 230 being received, based on a user input, or based on any other suitable indicators.

At this point, output inspector 215 is operable to identify one configuration 220 as the optimized configuration 235 for system 100 based on a comparison of the optimization factors of each possible configuration 220 of system 100. For another particular embodiment, output inspector 215 may be operable to end the testing process when a configuration 220 that comprises a target optimization factor is identified. This configuration 220 is considered the optimized configuration 235. Output inspector 215 is then operable to provide the optimized configuration 235 as an output of architecture exploration tool 200, after which system 100 may be configured using the parameters associated with the optimized configuration 235. In this way, system 100 may be optimized.

FIG. 3 is a flow diagram illustrating a method 300 for optimizing software-defined radio system 100 using architecture exploration tool 200 according to the principles of the present invention. Initially, configuration provider 205 provides one of a plurality of configurations 220 received from a user of architecture exploration tool 200 to input provider 210 and output inspector 215, with each configuration 220 comprising a group of parameters for each processor 105 of system 100 that is different in some way from each remaining configuration 220 (process step 305).

Input provider 210 provides a set 225 of M input words to each processor 105 at an input rate of X based on configuration 220 (process step 310). It will be understood that the values of M and X may or may not be different values for each processor 105. Processors 105 process the M input words in any suitable manner (process step 315). For example, for one embodiment, each processor 105 unpacks the packet containing the M input words and performs a checksum on the values of the M input words. For a particular embodiment, the values of the M input words equal their labels, which may comprise integer values ranging from 0 up to M−1. For another particular embodiment, each processor 105 may perform an XOR operation on the inputs in order to generate the checksum value.

After processing the M input words, each processor 105 generates N output words at an output rate of Y, with N and Y determined based on the input set 225 received from input provider 210, and provides the outputs 230 to output inspector 215 (process step 320). For one embodiment, each processor 105 performs a checksum, such as by performing an XOR operation, on the received M input words to generate the first output word 230. Each processor 105 then increments the checksum by one in order to generate the second output word 230, increments the checksum by two in order to generate the third output word 230, and so on until the $N^{th}$ output word 230 is generated.

Output inspector 215 determines an optimization factor for configuration 220 based on the associated outputs 230 (process step 325). If there are more configurations 220 to be tested (process step 330), configuration provider 205 provides another configuration 220 and the process repeats (process step 305). However, once all configurations 220 to be tested have been provided by configuration provider 205 (process step 330), output inspector 215 identifies an optimized configuration 235 by comparing the optimization factors for the tested configurations 220 or, alternatively, identifying the configuration 220 comprising a target optimization factor (process step 335). System 100 is then configured using the parameters of the optimized configuration 235, resulting in system 100 being optimized (process step 340).

Although the present invention has been described with an exemplary embodiment, various changes and modifications may be suggested to one skilled in the art. It is intended that the present invention encompass such changes and modifications as fall within the scope of the appended claims.

What is claimed is:

1. A method for optimizing a software-defined radio system comprising a plurality of processors, the method comprising:
    for each of the plurality of processors,
        providing an input burst comprising a first specified burst size, M, of input words to the processor for each of a plurality of configurations, each input word comprising an integer, and
        receiving from the processor an output burst comprising a second specified burst size, N, of output words generated by the processor based on the M input words for each of the configurations;
    determining an optimization factor for each of the configurations based on the N output words generated by each processor for the configuration; and
    identifying an optimized configuration from the plurality of configurations based on the optimization factor of each of the configurations.

2. The method as set forth in claim 1, the first specified burst size, M, different from the second specified burst size, N.

3. The method as set forth in claim 1, a first one of the N output words generated by the processor performing a checksum on the integers comprising the M input words and each subsequent one of the N output words generated by incrementing an immediately previous one of the N output words by one.

4. The method as set forth in claim 3, the processor performing the checksum comprising the processor performing an XOR operation.

5. The method as set forth in claim 1, providing the M input words to the processor comprising providing the M input words to the processor at an input rate determined based on the configuration.

6. The method as set forth in claim 5, further comprising providing an output rate determined based on the configuration to the processor, the processor operable to generate the N output words at the output rate.

7. The method as set forth in claim 1, the first specified burst size, M, for one of the processors different from the first specified burst size, M, for another one of the processors.

8. The method as set forth in claim 1, the second specified burst size, N, for one of the processors different from the second specified burst size, N, for another one of the processors.

9. A method for optimizing a software-defined radio system comprising a plurality of processors, the method comprising, for each of the plurality of processors:
    receiving an input burst comprising a first specified burst size, M, of input words for each of a plurality of configurations from an architecture exploration tool, each input word comprising an integer;

generating an output burst comprising a second specified burst size, N, of output words based on the M input words for each of the configurations; and providing the N output words to the architecture exploration tool, the architecture exploration tool operable to determine an optimization factor for each of the configurations based on the N output words generated by each processor for the configuration and to identify an optimized configuration from the plurality of configurations based on the optimization factor of each of the configurations.

10. The method as set forth in claim 9, the first specified burst size, M, different from the second specified burst size, N.

11. The method as set forth in claim 9, generating the N output words comprising performing a checksum on the integers comprising the M input words to generate a first one of the N output words and, for each subsequent one of the N output words, incrementing an immediately previous one on the N output words by one.

12. The method as set forth in claim 11, performing the checksum comprising performing an XOR operation.

13. The method as set forth in claim 9, receiving the M input words comprising receiving the M input words at an input rate determined by the architecture exploration tool based on the configuration.

14. The method as set forth in claim 13, further comprising receiving an output rate determined based on the configuration from the architecture exploration tool, and generating the N output words comprising generating the N output words at the output rate.

15. The method as set forth in claim 9, the first specified burst size, M, for one of the processors different from the first specified burst size, M, for another one of the processors.

16. The method as set forth in claim 9, the second specified burst size, N, for one of the processors different from the second specified burst size, N, for another one of the processors.

17. An architecture exploration tool capable of optimizing a software-defined radio system comprising a plurality of processors, the architecture exploration tool comprising:

a configuration provider operable to provide a plurality of configurations in succession;

an input provider coupled to the configuration provider and to the processors, the input provider operable to receive each of the configurations from the configuration provider in succession and to provide to each of the processors an input burst comprising a first specified burst size, M, of input words based on each of the configurations in succession, each input word comprising an integer; and an output inspector coupled to the configuration provider and to the processors, the output inspector operable to receive each of the configurations from the configuration provider in succession, to receive from each processor an output burst comprising a second specified burst size, N, of output words generated by the processor based on the M input words for each of the configurations in succession, to determine an optimization factor for each of the configurations based on the N output words generated by each processor for the configuration, and to identify an optimized configuration from the plurality of configurations based on the optimization factor of each of the configurations.

18. The architecture exploration tool as set forth in claim 17, the first specified burst size, M, different from the second specified burst size, N.

19. The architecture exploration tool as set forth in claim 17, a first one of the N output words generated by the processor performing a checksum on the integers comprising the M input words and each subsequent one of the N output words generated by the processor incrementing an immediately previous one of the N output words by one.

20. The architecture exploration tool as set forth in claim 17, the input provider operable to provide the M input words to the processor at an input rate determined based on the configuration and to provide an output rate determined based on the configuration to the processor, the processor operable to generate the N output words at the output rate.

* * * * *

UNITED STATES PATENT AND TRADEMARK OFFICE
CERTIFICATE OF CORRECTION

| | |
|---|---|
| PATENT NO. | : 7,571,205 B2 |
| APPLICATION NO. | : 11/173131 |
| DATED | : August 4, 2009 |
| INVENTOR(S) | : Oz et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1068 days.

Signed and Sealed this

Seventh Day of September, 2010

David J. Kappos
*Director of the United States Patent and Trademark Office*